United States Patent Office 3,511,920
Patented May 12, 1970

3,511,920
WORM GEARING WITH OVERLOAD
APPLIED BRAKE
Wilhelm Hertfelder, Steinenbronn Kreis, Boblingen, Germany, assignor to Robert Bosch GmbH, Stuttgart, Germany
Filed June 5, 1968, Ser. No. 734,635
Claims priority, application Germany, June 9, 1967,
B 92,926
Int. Cl. F16d 67/00
U.S. Cl. 192—7                                              9 Claims

ABSTRACT OF THE DISCLOSURE

An arrangement for shifting slidable windows in automotive vehicles and similar elements between an open and a closed position. A reversible motor has a drive shaft which can alternately be rotated in opposite directions. A worm drive arrangement includes a rotatable worm wheel associated with the window to be moved and capable of shifting the same in the desired direction. A worm gear is rigid with the drive shaft and meshes with the worm wheel to transmit motion thereto. The worm gear has slight freedom of axial movement which it performs if it encounters resistance to rotation by the worm wheel, such resistance resulting in turn from resistance to the movement of the window. Limiting means limits the torque transmitted from the motor to the window when resistance to movement of the latter is encountered and includes a spring engaging the worm gear in such a manner as to oppose axial sliding thereof, and a brake structure associated with the worm gear and becoming actuated for braking rotation of the latter when resistance to rotation of the worm wheel becomes sufficient to result in axial shifting of the worm gear against the opposition of the spring.

BACKGROUND OF THE INVENTION

The present invention relates to an arrangement for shifting of movable structural components in general, and more particularly to an arrangement for the opening and closing of windows, doors, sliding roofs or the like, particularly in motor vehicle.

It is not new to provide windows, doors, sliding roofs and the like, particularly in motor vehicles, with power assists which cause movement of these various components between the open and closed positions thereof when actuated. The power arrangements provided for this purpose are usually provided with limit switches which deactivate the electromotor employed whenever the respective door, window, sliding roof or the like, which hereafter will be designated in toto as structural component, reaches its end position in which it is either in closed or in open position. However, there exists another control problem in these applications, namely the fact that there may be opposition to the movement of the structural component before the same has reached one or the other of its end positions. For example, the power assist arrangement may have been actuated for closing the window of a motor vehicle, and the arm, hand or head of a small child may be in the way, that is it may be located in the window opening. If under these circumstances no provision is made for automatically terminating continued movement of the widow to closed position, the child may sustain more or less severe injuries which may, under certain circumstances, even be fatal.

For these reasons known constructions of the type here under discussion utilize a slip-type coupling of known construction. This, however, has the disadvantage that the torque transmission between the reversible electromotor and the structural component is limited in both directions of rotation of the electromotor, that is regardless of whether the structural component moves from open to closed position, or from closed to open position. This is undesirable because it is frequently necessary to transmit to the structural component a higher torque than is permitted by the slip-type coupling, for instance to move the structural component from its closed position in which it may be stuck, for instance by the formation of ice on a vehicle window or other component. Furthermore, the use of a slip-type coupling has the disadvantage of increasing the number of constituent components involved in the drive arrangement and of increasing the dimensions thereof. Finally, the value for the torque to be transmitted, which value can be preselected, will gradually change unless additional means are provided for preventing such change, an expedient which of course increases the number of constituent components and thereby the cost of the arrangement still further, and which also increases still further the dimensioning.

Another construction of the type here under discussion utilizes electrical switching components which, when the drive motor draws increased power in response to encountering of resistance by the movable component, either switch the drive motor off or reverse its direction of rotation. While this is a feasible approach to the problem at hand, these constructions require significant technological expenditure in terms of switching components, and are therefore expensive.

It is thus a general object of the present invention to overcome the disadvantages which have been outlined.

A more specific object of the invention is to provide an arrangement of the type in question which provides the desired advantages, eliminates the aforementioned disadvantages, and is simple and inexpensive to construct.

A further object of the invention is to provide such an arrangement which eliminates any possibility of injury to persons or objects against which the respective movable structural component may impinge, and which are active for limiting the torque transmitted to the movable structural component only during the closing movement thereof while transmitting the entire torque thereof during opening movement, subject only to normal frictional losses.

SUMMARY OF THE INVENTION

In pursuance of the above objects, and of others which will become apparent hereafter, one feature of my invention resides in the provision of an arrangement of the type here in question which includes reversible motor means having a drive shaft which is rotatable alternately in opposite directions. One drive means is provided which includes a rotatable worm wheel associated with the structural component to be moved and operative for effecting shifting of the same in the respective directions. A worm gear is rigid with the drive shaft and meshes with the worm wheel for transmitting motion thereto. The worm gear is mounted axially slidable in response to inhibition of the rotation of the worm wheel resulting from resistance to movement of the structural component in the respective direction. Limiting means limits the torque transmitted from the motor means to the structural component in question when the latter encounters resistance to its movement, and this limiting means comprises spring means engaging the worm gear in a sense opposing axial sliding thereof, and brake means associated with the worm gear and operative for braking rotation thereof when the inhibition of the rotation of the worm gear by the worm wheel is sufficient for effecting axial sliding of the worm gear against the opposition of the spring means.

It will be appreciated that with the construction according to my present invention the need for providing a slip-type clutch is eliminated and the rotor of the motor, which is connected with the worm gear without the intermediary of such a clutch, is braked to a halt very quickly. On the other hand, if no obstacle to movement of the driven movable structural component is encountered as the latter moves towards closed position, the full torque of the motor is available, just as is fully available during movement of the movable structural component towards its open position. This means that the movable structural component can be moved either to open position or the closed position at substantially identical speeds because there is no or very little loss of torque in the absence of resistance to the movement of the structural component. My construction may be such that the overload torque of the braked motor is largely absorbed by the braking means so that the force exerted on the movable component under circumstances where the movement of the same is to be terminated, is only very small.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
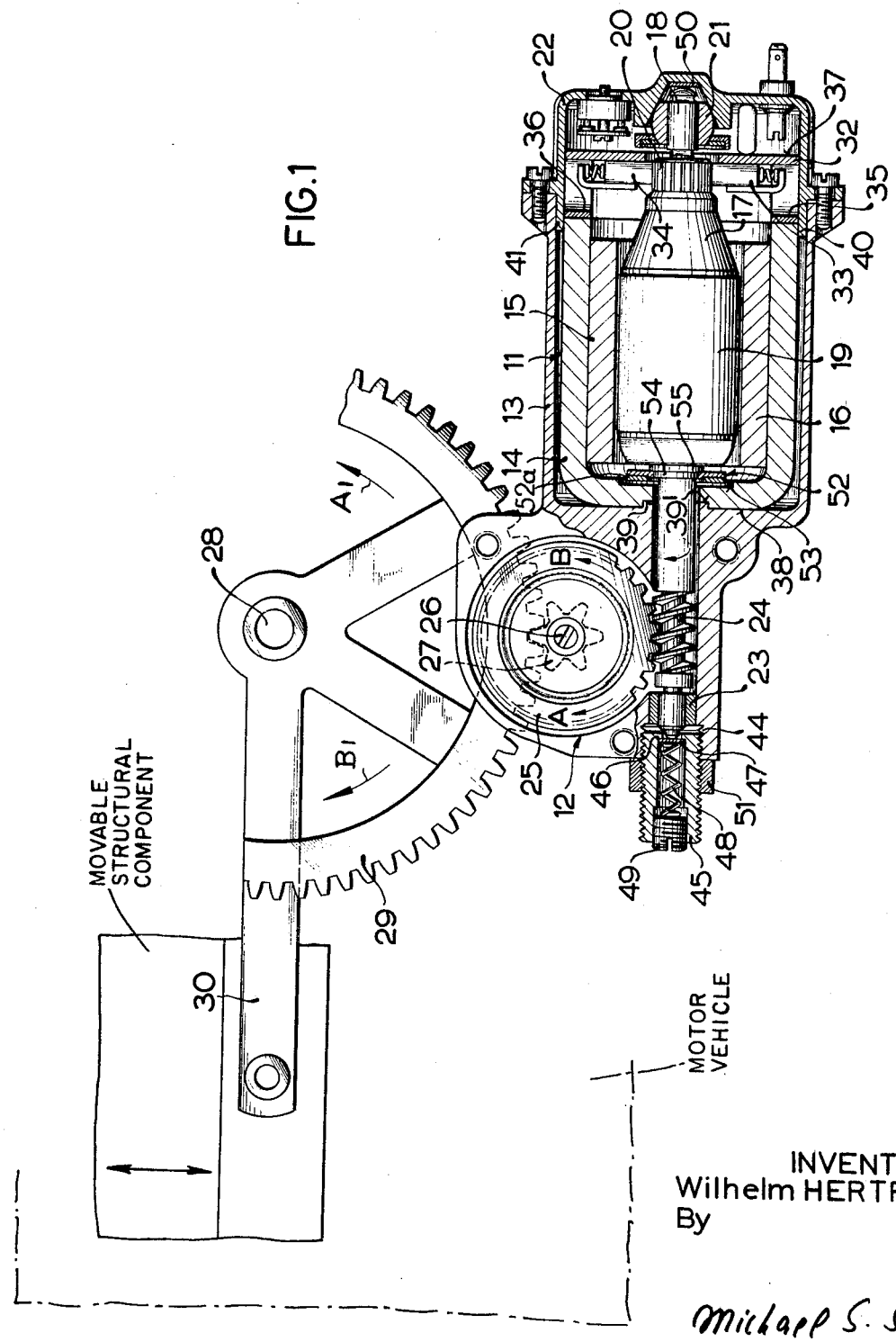
FIG. 1 is a longitudinal section through an arrangement embodying my invention.

As shown in FIG. 1, my arrangement comprises an electromotor 11 which is here assumed to be of the permanent magnet direct-current type. It is received in a housing 13, together with a worm drive 12. The housing 13 has an open end closed by a cover 22 wherein there is affixed a supporting plate 32 for the brushes 33 and 34 of the commutator 20; the supporting plate 32 is secured against undesired turning. Opposite the open side the housing 13 is provided with a wall 38 separating the chamber in which the electromotor 11 is located from the chamber in which the worm drive 12 is located. In this latter chamber is a tapped bore 44 whose purpose will be described in more detail subsequently.

The electromotor 11 comprises a substantially U-shaped magnetic yoke 14 whose arms carry permanent magnets 15 and 16. The rotor 7 includes a drive shaft 18 which carries a winding 19 and the aforementioned commutator 20. At its commutator end the drive shaft 18 is journalled in a callote-shaped bearing 29 which is secured in the cover 22. The opposite end of the drive shaft 18 extends through the intermediate wall 38 and is journalled in the worm drive chamber in cylindrical sleeve bearing 23. In the illustrated embodiment a worm gear 24 is formed integrally, that is of one-piece construction with the drive shaft 18, and this worm gear 24 meshes with a worm wheel 25 which is mounted on a shaft 26 on which there is also mounted a toothed pinion 27. The pinion 27 meshes with the teeth of a segmental rack 29 which is journalled for rotation at 28 and rigid with a lever 30. The latter transmits movement to a movable structural component via a suitable linkage arrangement. To avoid impairing the clarity of the illustration, neither the linkage arrangement nor the movable structural component which here will be assumed to be the window of an automotive vehicle, are illustrated.

The supporting plate 32 of the cover 22 is pressed against axially extending abutments 37 of the cover 22 by the diagrammatically illustrated biasing springs 35 and 36 which are in turn arranged to bear upon the ends of the arms of the yoke 14 so as to press the bight thereof against the intermediate wall 38. The bight is provided with a depression 40 into which an annular projection 39 on the intermediate wall 38 extends. The arms of the yoke 14 are resiliently deflectable and engage with spring bias the abutments 40 and 41 of the cover 22 with their end portions, thus preventing a turning of the yoke 14 about the axis of the motor 11. The diagrammatically illustrated biasing springs 35 and 36 serve to maintain the yoke 14 and the separating plate 32 in the housing and in the cover, respectively, tightly and without possibility of rattling.

An externally threaded sleeve 45 is screwed into the tapped bore 44 and is provided at that of its ends which faces towards the drive shaft 18 an inwardly directed annular shoulder 46. An abutment member 47, which is slidably guided in the interior of the sleeve 45, abuts against the annular shoulder 46. For this purpose a spring 48 is provided which bears upon the abutment member 47 on the one hand and upon a screw 49 which is threaded into the tapped interior of the sleeve 45. As illustrated, the sleeve 45 is screwed into the bore 44 to such an extent that the abutment member 47 just touches the axial end-face of the drive shaft 18 when the opposite axial end of the latter abuts a plate member 50 of steel or another analogous material which is mounted in the cover 22. In the illustrated embodiment, a nut 51 is provided which serves to prevent the sleeve 45 from undesired movement out of its once selected position. The screw 49 serves not only as an abutment for the spring 48, but also as an adjustment means, it being evident that depending on the extent to which the screw 49 is screwed into the interior of the sleeve 45, the spring 48 will be compressed to a greater or lesser degree so as to exert a greater or lesser biassing force upon the drive shaft 18.

As shown in FIG. 1, an annular disk member 52 is provided on the rotor 17 and this carries a layer of braking material 52, which may be of any well known type. A frictional surface 52 of annular outline is provided on the inner side of the bight of the yoke 14, facing the annular disk 52. The latter is immovably secured on an annular bead 54 of the drive shaft 18 and abuts against an annular shoulder 55 of the latter. Movement of the layer 52a into abutment with the surface 53 will produce friction between the two resulting in a braking action.

Figure 2:
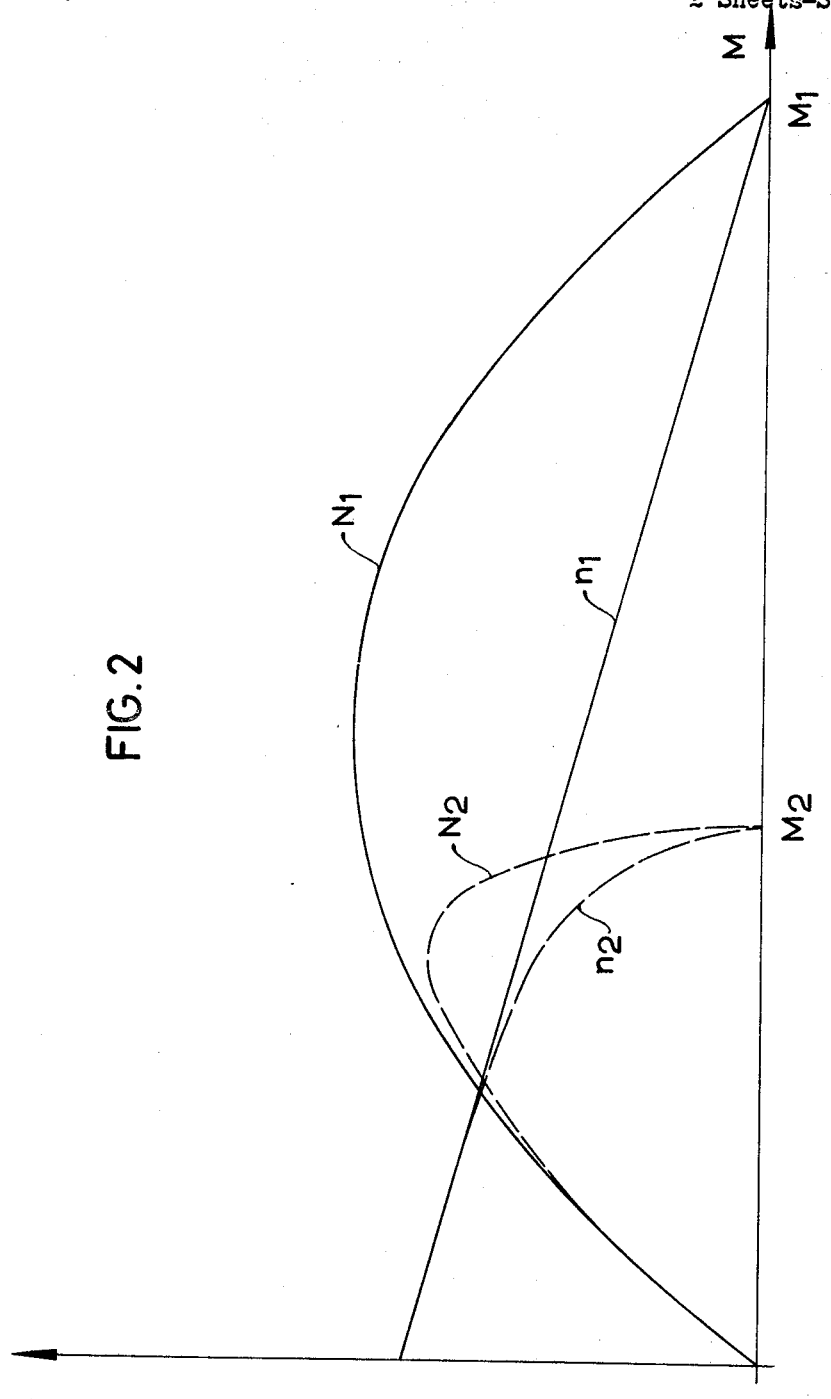
FIG. 2 is a graph showing torque transmission characteristics of the embodiment illustrated in FIG. 1.

The graph in FIG. 2 identifies the number of rotations per minute of the motor 11 with the designation $n$, and the force N supplied by the motor to the worm wheel in dependence upon the torque M supplied to the worm wheel. The characteristic lines $m_1$ and $M_1$ are valid for rotation of the motor 11 in a sense effecting movement of the structural component from closed to open position, whereas the characteristic lines $m_2$ and $M_2$ characterize the operation of the motor during rotation of the same in a sense effecting movement of the structural component from open to closed position.

It will be understood that, if the structural component which herein is assumed to be a window as mentioned before, is to be moved from closed to open position, the motor drive shaft 18 effects rotation of the worm wheel 25 in the direction of the arrow A, and this in turn causes turning of the segmental rack 29 in counterclockwise direction so that the lever 30 moves downwardly as seen in FIG. 1. The frictional resistance of the window to such movement causes the worm wheel 25 to exert axial pressure on the worm gear and thus on the drive shaft 18, effecting pressing of the latter against the plate 50 in the cover 22. In this operative mode almost the entire power of the motor is transmitted to the worm wheel only reduced by the normal frictional losses of the motor and the worm drive, and the window thus moves reliably and quickly from closed position towards open position. As seen in FIG. 2 the motor 11 has a high overload torque $M_1$ which guarantees movement of the window to open position even if the window is stuck in closed position, for instance as the result of ice formation.

If, now, the direction of movement of the window is to be reversed, that is if the window is to be moved from open to closed position, then the drive shaft 18 turns the worm wheel via the worm gear in the direction of the arrow B. This causes clockwise movement of the segmental rack and a lifting of the lever 30 in upward direction, as seen in FIG. 1. The worm wheel 25 again exerts pressure on the drive shaft 18 via the worm gear, but this time in a sense causing the drive shaft 18 to be pressed against the abutment member 47. If now this resistance of the worm wheel, which resistance of course results in this axial pressure, exceeds a predetermined limit because an object or a part of the human anatomy is located between the window and the frame for the window, thus being engaged by the window and providing resistance to continued movement of the window towards its closed position, then the axial pressure exerted on the shaft 18 via the worm wheel 25 overcomes the opposition of the spring 48 and shifts the drive shaft 18 towards the left-hand side in FIG. 1 until the layer 52a of the annular disk member 52 abuts against the frictional surface 53 on the yoke 14. From this moment on a continuing axial movement of the drive shaft 18 towards the left in FIG. 1 results in increasingly larger portion of the motor torque being destroyed by the friction developing between the layer 52a and the surface 53. Thus, the rotations per minute of the motor designated $n_2$ in FIG. 2, decrease rapidly and the motor quickly comes to a halt. In this case the overload torque $M_2$ is considerably smaller than the overload torque $M_1$. In other words, whenever resistance to movement of the window towards its closed position develops which is in excess of normal frictional resistance, the motor 11 will be braked very quickly so that the window will rapidly stop and will then be pressed against the obstacle in its path only with low force. This force can be adjusted to any desired value by simply changing the setting of the screw 49.

It will of course be appreciated that a variety of modifications is possible, all of which are intended to be encompassed in the present disclosure. Thus it is evident that a different braking means can be utilized than the one which has been shown in the exemplary embodiment. However, the one shown is particularly advantageous because it requires only a single additional component, namely the annular disk member 52, which can be simple and inexpensively manufactured. It will also be appreciated that the member 52 could be secured in other manner than has been illustrated, just as it will be appreciated that for instance the worm gear need not be integral in the sense that it is of one-piece construction with the drive shaft 18, but that it could be otherwise secured to the drive shaft in the necessary manner but without the provision of a slip-type clutch.

It is further possible to use a spring different from the one identified with reference numeral 48 herein. However, I have found it to be advantageous to use a spiral spring with a flat characteristic line because such a spring makes possible a precise adjustment of the desired spring pressure. Also, the adjustment of varying means provided may be other than what has been shown, and it is not necessary for the spring 48 to be received in a sleeve as shown, because other arrangements can be made. Again, however, this arrangement is advantageous because it makes it possible to select the spring with a view towards the required spring pressure and the characteristic spring line without having to take into consideration space limitations imposed by the dimensioning of the housing. This is advantageous, for instance by contrast with known constructions of the general type here in question which utilize slip-type couplings and, to obtain a flat overall dimensioning of the device, employ dish springs whose steep spring characteristic line is one of the reasons why the transmissible torque of the coupling changes over a period of time.

It will also be appreciated that, as should still be mentioned, one advantage of the embodiment herein illustrated is the fact that the worm arrangement need not be self-locking but that the desired locking function of the worm drive would nevertheless be available in many circumstances.

It will be understood that each of the elements described above, or two or more together, may also find a useful application in other types of arrangements differing from the types described above.

While the invention has been illustrated and described as embodied in an arrangement for shifting of movable structural components, it is not intended to be limited to the details shown, since various modifications and structural changes may be made without departing in any way from the spirit of the present invention.

Without further analysis, the foregoing will so fully reveal the gist of the present invention that others can by applying current knowledge readily adapted for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for shifting a movable structural component of a motor vehicle in mutually opposite directions, comprising a motor vehicle; a movable structural component in said motor vehicle shiftable in mutually opposite directions; reversible electric motor means having a drive shaft rotatable alternately in opposite directions; worm drive reduction gear means, including a rotatable worm wheel associated with said structural component and operative for effecting shifting of the same in said mutually opposite directions, and a worm gear rigid with said drive shaft and meshing with said worm wheel for transmitting motion thereto, said worm gear being axially slidable in response to inhibition of the rotation of said worm wheel resulting from resistance to movement of said structural component in the respective direction; and limiting means for limiting the torque transmitted from said motor means to said structural component when resistance to movement of said structural component is encountered, comprising spring means engaging said worm gear in a sense opposing axial sliding thereof, and brake means associated with said worm gear and operative for braking the rotation thereof when the inhibition of the rotation of said worm gear by said worm wheel is sufficient for effecting axial sliding of said worm gear against the opposition of said spring means.

2. An arrangement as defined in claim 1; further comprising stationary support means adjacent said worm gear; and wherein said brake means comprises respective friction surfaces provided on said worm gear and said support means and arranged for abutting frictional engagement in response to axial sliding of said worm gear.

3. An arrangement as defined in claim 2, said friction surfaces respectively extending in planes inclined to the axis of rotation of said worm gear.

4. An arrangement as defined in claim 2, said friction surface on said worm gear extending in a plane normal to the axis of rotation of said worm gear.

5. An arrangement as defined in claim 4, wherein said worm gear is of one-piece construction with said drive shaft, and wherein the latter is mounted axially slidable.

6. An arrangement as defined in claim 5, said drive shaft comprising a radial flange, and said braking means comprising an annular member surrounding said drive shaft secured to and supported by said radial flange and being provided with one of said friction surfaces.

7. An arrangement as defined in claim 1; and further comprising varying means operative for varying the force with said spring means opposes axial sliding of said worm gear.

8. An arrangement as defined in claim 7, said worm gear comprising a shaft; housing means defining a chamber accommodating said worm gear and including a bore having an inner open end communicating with said chamber and into which said shaft projects with clearance, and an outer open end; and wherein said spring means is located in said bore.

9. An arrangement as defined in claim 8, wherein said bore is tapped; and said varying means comprises an externally threaded sleeve threaded into said tapped bore from said outer open end and accommodating said spring means so that the same is progressively compressed in response to threading of said sleeve deeper into said bore.

References Cited

UNITED STATES PATENTS

| | | | |
|---|---|---|---|
| 1,829,825 | 11/1931 | Freeman | 192—8 |
| 3,219,154 | 11/1965 | Schenck et. al. | |
| 3,329,243 | 7/1967 | Gibb | 192—7 |
| 3,433,332 | 3/1969 | Braun | 188—134 |

BENJAMIN W. WYCHE III, Primary Examiner

U.S. Cl. X.R.

74—425; 188—134; 49—363